(12) United States Patent
Harrington et al.

(10) Patent No.: US 8,208,860 B2
(45) Date of Patent: Jun. 26, 2012

(54) REDUCING MULTIPATH SIGNAL DEGRADATION EFFECTS IN A WIRELESS TRANSMISSION SYSTEM

(75) Inventors: Nathan J. Harrington, Cary, NC (US);
Harry L. Hoots, III, Raleigh, NC (US);
Belton L. Monroe, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 12/611,476

(22) Filed: Nov. 3, 2009

(65) Prior Publication Data

US 2011/0105035 A1    May 5, 2011

(51) Int. Cl.
*H04B 17/00*    (2006.01)
*H04W 24/00*    (2009.01)

(52) U.S. Cl. .................................. 455/67.11; 455/456.1

(58) Field of Classification Search ..................... 455/65, 455/67.11, 404.2, 407.1, 456.1, 456.3, 569.2, 455/575.9, 95, 96, 97, 98, 99, 152.1, 238.1, 455/297, 345, 106, 242.1, 242.2, 243.1, 7, 455/8, 9

See application file for complete search history.

(56) References Cited

U.S. PATENT DOCUMENTS

| | | | |
|---|---|---|---|
| 5,648,987 A | 7/1997 | Yang et al. | |
| 6,112,095 A | 8/2000 | Wax et al. | |
| 6,370,207 B1 | 4/2002 | Weill et al. | |
| 6,693,592 B2 | 2/2004 | Dowdle et al. | |
| 2008/0198072 A1 | 8/2008 | Elwell et al. | |
| 2009/0102707 A1 | 4/2009 | Elwell, Jr. et al. | |

FOREIGN PATENT DOCUMENTS

| | | |
|---|---|---|
| WO | 02052225 A2 | 7/2002 |
| WO | 03096055 A2 | 11/2003 |

OTHER PUBLICATIONS

Turin, "Introduction to Spread-Spectrum Antimultipath techniques and Their Application to Urban Digital Radio", Proceedings of the IEEE, vol. 68, No. 3, Mar. 1980, pp. 328-353.

*Primary Examiner* — Eugene Yun
(74) *Attorney, Agent, or Firm* — Yee & Associates, P.C.; John R. Pivnichny

(57) ABSTRACT

A transmitter transmits a signal to a receiver along a transmission path. The respective positions of the transmitter and the receiver are determined, and notice is received that a moving vehicle is proximate to the transmission path. Responsive to such notice, the moving vehicle position is determined, and such position is used with the transmitter and receiver positions to determine whether the moving vehicle is located between the transmitter and receiver positions. If so, the moving vehicle position is used to calculate the time delay between the times at which first and second components of the transmitted signal are received at the receiver, wherein the first component is transmitted directly to the receiver, and the second component is transmitted to the receiver after reflection from the moving vehicle. The calculated time delay is then used to provide a corrective signal component, which is employed to reduce degradation of the first component caused by the second signal component.

20 Claims, 3 Drawing Sheets

REDUCING MULTIPATH SIGNAL DEGRADATION EFFECTS IN A WIRELESS TRANSMISSION SYSTEM

BACKGROUND

1. Field

The invention disclosed and claimed herein generally pertains to a method for reducing multipath signal degradation effects which occur at the receiver of a wireless transmission system. More particularly, the invention pertains to a method of the above type wherein the multipath degradation effects are caused by a moving signal-reflective vehicle, such as an aircraft or other object, which passes through the signal transmission path. Even more particularly, the invention pertains to a method of the above type wherein multipath signal degradation is reduced by determining the specific position of the moving aircraft or other reflective vehicle, with respect to components of the wireless transmission system.

2. Description of the Related Art

Ghosting, or the occurrence of ghosts in a displayed television or video image, is a well known example of multipath distortion or degradation that can affect reception of transmitted signals. Typically, one component of a transmitted television signal travels directly from the transmitter to a television receiver, to produce a primary image at the receiver. Another signal component travels toward a signal reflective structure, such as a building or the like, or toward a moving structure or object, such as an aircraft, and is reflected thereby to the receiver. Since the reflected component travels over a longer path than the direct component, the reflected component experiences a slight time delay in reaching the television receiver, with respect to the direct component. The reflected component produces a secondary image, which is generally fainter than the primary image, and is offset positionally from the primary image.

As is well known by those of skill in the art, ghosting is a phenomenon associated with analog television. However, multipath degradation of the above type can also affect digital television transmissions. More particularly, reception of both direct and reflected components of the same digital signal can cause bit framing errors. These errors result in audio distortions and loss of picture quality.

Aircraft and other moving vehicles or objects raise special issues in regard to multipath signal degradation, in that their positions are not fixed with respect to the signal transmission system transmitter or receiver. Also, the travel or entry of such moving vehicles into regions of wireless signal transmission, resulting in multipath effects as described above, will frequently be unknown or unpredictable. At present, however, techniques used to remove the effects of secondary signal reception, caused by moving aircraft or the like, generally require extensive and sophisticated signal processing operations. Such techniques are supported by circuit designs and processing logic that is usually characterized by a high degree of complexity.

SUMMARY

Embodiments of the invention can comprise methods, apparatus and computer program products for reducing multipath signal degradation effects, of the type described above, in a wireless transmission system. Embodiments may be used with an analog or digital television transmission system, but the invention is not limited thereto. Embodiments of the invention provide a comparatively simple and inexpensive technique that uses the real-time position of a nearby aircraft, or other moving vehicle, to correct or compensate for secondary signal reception caused by reflection from the vehicle. The technique is applicable to correct deleterious effects associated with ghosting or bit frame errors in analog or digital transmission schemes, respectively, but again is not limited thereto.

One embodiment directed to a method is associated with a wireless system, wherein a transmitter is disposed to transmit a signal to a receiver along a signal transmission path extending between the transmitter and receiver. The method comprises the steps of selectively determining the respective positions of the transmitter and the receiver, and receiving notice at a selected location that a moving vehicle is proximate to the signal transmission path. Responsive to receiving the notice, the position of the moving vehicle is determined, and the determined positions of the transmitter, the receiver and the moving vehicle are used to determine whether the moving vehicle is located between the transmitter position and the receiver position. Responsive to determining that the moving vehicle is located between the transmitter and the receiver positions, the moving vehicle position is used to calculate the time delay between the times at which first and second components of the transmitted signal are respectively received at the receiver, wherein the first signal component is transmitted directly to the receiver from the transmitter along the signal transmission path, and the second signal component is transmitted to the receiver after reflection from the moving vehicle. The method further includes using the calculated time delay to provide a corrective signal component, wherein the corrective signal component is employed to reduce degradation of the first signal component that is caused by the second signal component.

DETAILED DESCRIPTION

Figure 1:
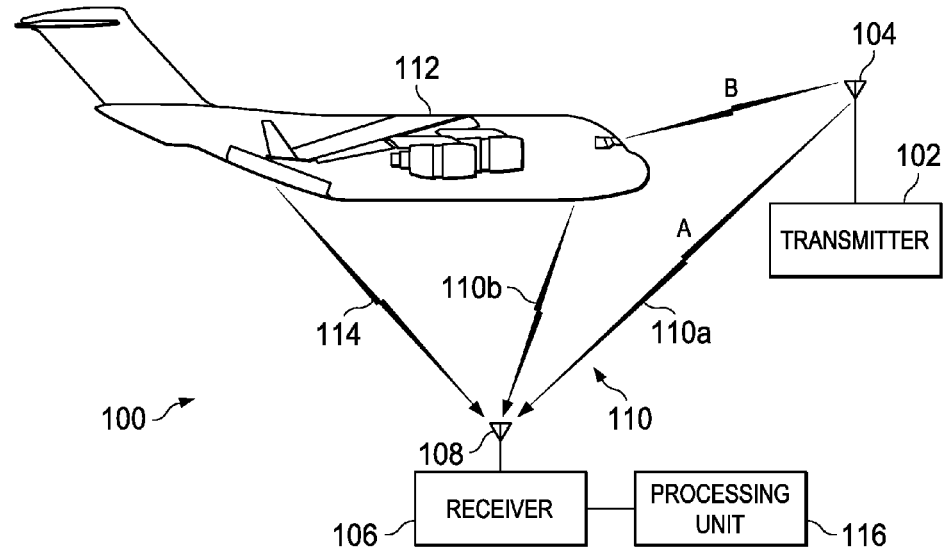
FIG. 1 is a schematic view showing a wireless transmission system provided with a processing unit or other component for implementing an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash Memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a signal transmission system 100 which includes a transmitter 102 having an antenna 104, and a receiver or signal receptor 106 having an antenna 108. Usefully, transmitter 102 comprises a tuned channel transmitter for transmitting either analog or digital television signals, and receiver 106 comprises a complementary tuner for receiving such signals. In common arrangements of this type, transmitter antenna 104 will be in the form of a television transmitter tower antenna. Also, transmitter 102 and its tower antenna 104 will typically comprise one television transmission station of multiple such transmission stations (not shown), which are at different locations from one another and transmit television signals at different channel frequencies. Receiver 106 can be tuned to receive the television signal from each transmission station, selectively.

FIG. 1 further shows transmitter 102 transmitting a signal 110, which has a direct or primary signal component 110a. Component 110a is transmitted directly from transmitter 102 to receiver 106 along a direct signal transmission path A, which extends between transmitter 102 and receiver 106. As used herein, the term "direct signal transmission path" means the path traveled by signals from a transmitter antenna, such as antenna 104, to a receiver antenna, such as antenna 108, where the traveling signals are not reflected by any structure or object.

Moreover, the transmitter antenna 104 may or may not be located at the same position as other components of TV transmitter 102, such as processing equipment thereof. Accordingly, as used herein, the term "transmitter position" means the position of the transmitter antenna component of the transmitter.

Referring further to FIG. 1, there is shown an aircraft 112 that has moved to a position whereby it has become proximate to signal transmission path A. As a result, it is likely that a component 110b of the transmitted signal 110 will encounter aircraft 112, and will be reflected thereby to receiver 106. The path of reflected or secondary signal component 110b is represented in FIG. 1 as signal path B. It is to be appreciated that the direct signal component 110a will arrive at antenna 108 of receiver 106 before reflected signal component 110b arrives at antenna 108. Thus, there is a time delay between these two components. Moreover, the reflected signal component 110b will distort or degrade the direct signal component 110a, in the manner described above. Accordingly, to correct or compensate for such degradation, a processing unit 116 is connected to receiver 106. Processing unit 116 is configured to perform a set of tasks, as described hereinafter in connection with FIG. 3, in order to provide the desired correction or compensation for signal 110.

FIG. 1 further shows an automatic dependent surveillance-broadcast (ADS-B) signal 114, described hereinafter in further detail, which is transmitted from aircraft 112 to receiver 108.

Figure 2:
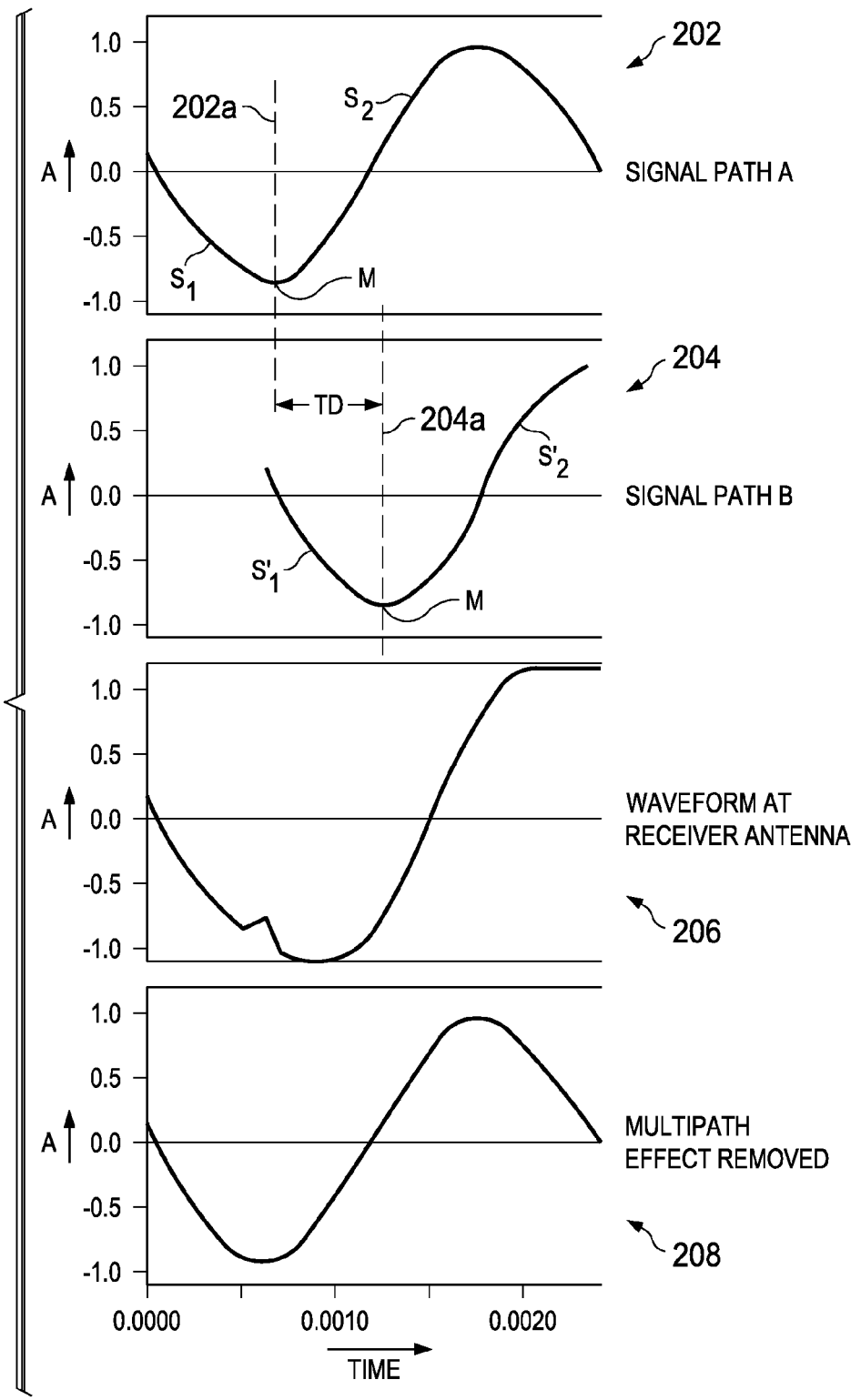
FIG. 2 is a signal diagram that depicts relationships between different signals associated with the system of FIG. 1.

Referring to FIG. 2, there are shown signal waveforms 202-208. The time axis for each of the waveforms is the common horizontal time axis depicted in FIG. 2. Each waveform has its own vertical amplitude axis A, where the amplitude axes are identical for all of the waveforms.

Signal waveform 202 depicts direct or primary signal component 110a, which is transmitted directly from transmitter 102 to receiver 106 along signal path A in FIG. 1, as described above. Waveform 204 shows reflected or secondary signal component 110b which is transmitted along signal path B in FIG. 1. Axes 202a and 204a respectively indicate the time at which minimum value M occurs for each of the components 110a and 110b in FIG. 1. The spacing between the axes 202a and 204a thus illustrates the time delay (TD) between receiving the direct component 110a and the reflected component 110b at the receiver 106 in FIG. 1. The cumulative multipath effect of signal components 110a and 110b results in signal degradation of direct component 110a at the receiver antenna, as depicted by waveform 206. Waveform 208 illustrates the signal at the receiver after the multipath effect has been removed, using an embodiment of the invention as described herein. Waveform 208 is thus substantially the same as waveform 202.

Figure 3:
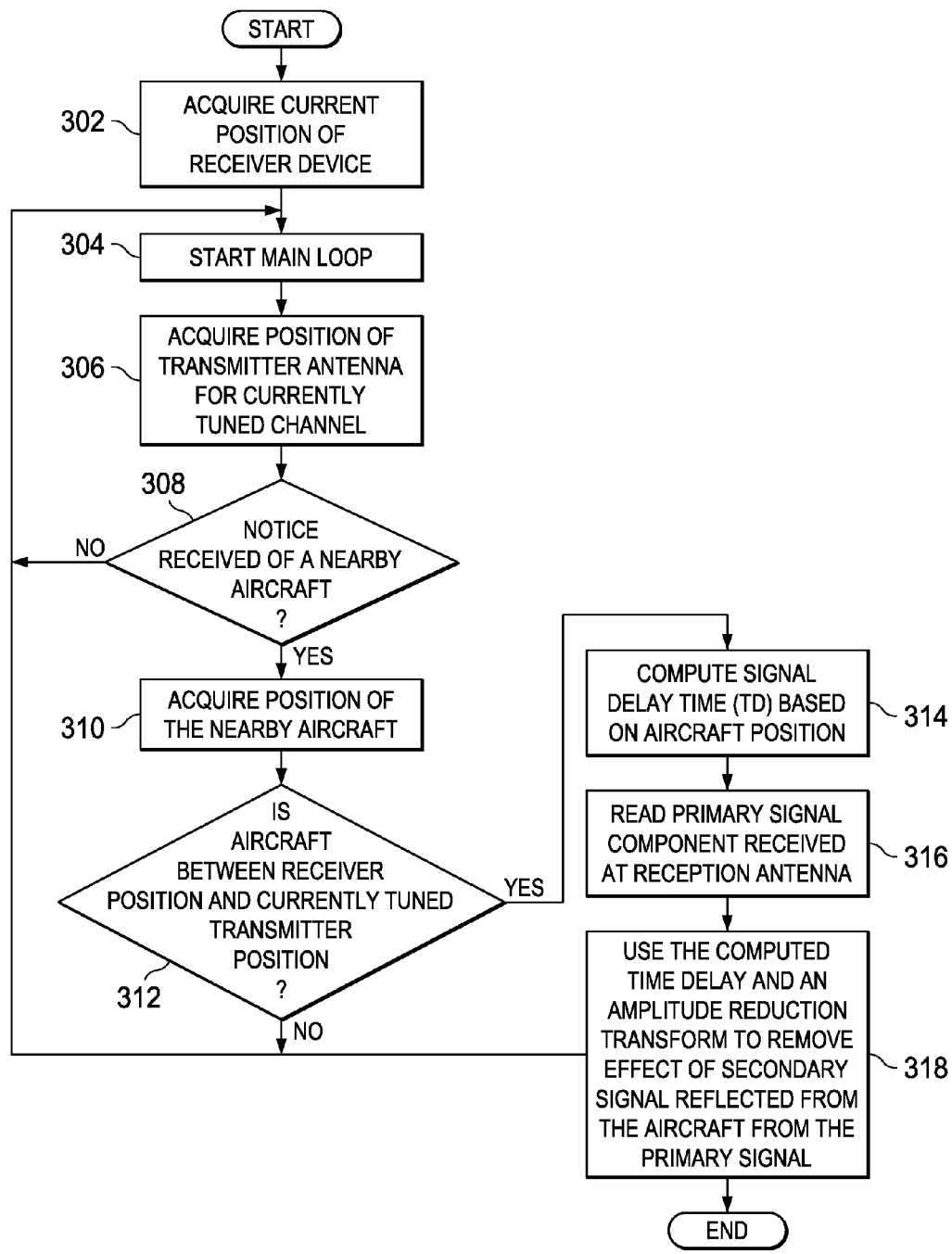
FIG. 3 is a flowchart depicting steps for a method comprising an embodiment of the invention.

Referring to FIG. 3, there is shown a flowchart illustrating a number of steps for a method comprising an embodiment of the invention. These steps or tasks may be carried out by processing unit 116, operating in association with components of receiver 106, and in an environment that includes signal transmission system 100 and aircraft 112 in FIG. 1, by way of example. Processing unit 116 may comprise, for example, a computer or data processing system that is configured or programmed for use in performing respective steps as disclosed in connection with FIG. 3.

The method of FIG. 3 commences with step 302, which requires acquisition of the then current position of the receiver or receptor. In a common situation for a television receiver 106 in FIG. 1, the receiver will be stationary and will remain at the same location for an extended period of time. In this case, it is only necessary to determine positional coordinates for the location when the receiver 106 is first placed at the location, and to then store such coordinates for later use, under the control of processing unit 116 in FIG. 1. The positional coordinates of the receiver location may be determined by means of a Global Positioning System (GPS) receiver placed at the location. Alternatively, the receiver location may already be known to the user thereof through other means. The receiver may also be provided with an interface, which may be used by a user to enter the precise coordinates of the receiver location.

At step 304, processing unit 116 in FIG. 1 commences a processing loop to carry out the remaining steps of the method of FIG. 3. In one embodiment, the loop would be commenced at the beginning of each of successive intervals, wherein the first interval would start when processing unit 116 first detects that receiver 106 in FIG. 1 is being operated to receive signals. Each such interval could, for example, be on the order of 1-10 milliseconds.

At step 306, following commencement of the loop, it is necessary to acquire the position of the tower or other antenna 104 in FIG. 1, of the transmitter producing the channel to which the receiver is tuned. Processing unit 116, from the channel frequency which is then being received, is configured to readily identify the particular transmitter which is supplying such channel. Usefully, the location of each transmitter antenna which is capable of sending signals to the receiver 106 will be retained in a database accessible to processing unit 116 in FIG. 1. Processing unit 116 will thus be able to readily provide the coordinates of the identified transmitter antenna. Alternatively, after identifying the transmitter supplying the signal received at the receiver, processing unit 116 could determine the position of the antenna of such transmitter by accessing information pertaining thereto from a remote database, or by accessing information that is available over the Internet.

In a modification of the embodiment of the invention shown in FIG. 3, the signal receiver would be at a location that could continually change, rather than a location that was stationary. This is a situation that is becoming quite common, as television receivers are increasingly being placed into cars and vans. In this modification, the step of acquiring the current position of the receiver would have to be performed each time the main loop was started, at step 304, and would usefully be performed either immediately before or immediately after step 306. Receiver position could be determined, for example, by means of a GPS device that was fixed to move or travel with the receiver.

Referring further to FIG. 3, there is shown decision step 308, which requires determining whether or not notice has been received that an aircraft is nearby, or is proximate to, components of signal transmission system 100 in FIG. 1. This query is made to determine whether an aircraft is sufficiently close to signal transmission path A that a component of the transmitted signal could be reflected from the aircraft to the receiver. If such reflection occurs, there could be multipath effects at the receiver, which would require correction in accordance with an embodiment of the invention.

In order to carry out step 308, a criterion is selected, wherein the criterion will be met when an aircraft 112 is proximate to the direct signal transmission path of system 100 in FIG. 1. For this condition, the aircraft will be close enough to reflect transmitted signal components to the receiver. Accordingly, when the criterion is met, notice is provided that the aircraft is nearby, or is proximate to the direct signal transmission path.

In one useful embodiment, the criterion pertains to the ADS-B signal 114 projected by aircraft 112 in FIG. 1. As is known by those of skill in the art, an ADS-B equipped aircraft determines its own position using a global navigation satellite system, and periodically broadcasts this position to potential ground stations and other aircraft. Accordingly, receiver 106 is configured to receive ADS-B signals from aircraft in the vicinity of transmission system 100 in FIG. 1. As the criterion, if an ADS-B signal is received at receiver 106, it will be assumed that the aircraft projecting the ADS-B signal must be regarded as being proximate to the transmission signal path. Using this criterion, processing unit 116 would provide an affirmative output at step 308, upon determining that receiver 106 had received an ADS-B signal. Step 308 would otherwise provide a negative output.

As an alternative criterion for step 308, a passive acoustic echo or other signal projected by an aircraft could be detected at receiver 106 in FIG. 1. Such signal would then be analyzed, to determine whether or not the aircraft providing the signal was proximate to signal transmission path A. In some embodiments, the criterion could be met if an aircraft was determined to be within a prespecified distance of a linear signal transmission path extending between the transmitter and receiver antennas.

As further shown by FIG. 3, the method returns to step 304 if decision step 308 produces a negative output. However, if the output of step 308 is affirmative, the method proceeds to step 310, to acquire the position of the aircraft noticed at step 308. If an ADS-B signal was received from the aircraft, such signal will include the positional coordinates of the aircraft. Accordingly, the aircraft position can be conveniently obtained from the ADS-B signal.

Alternatively, the aircraft position coordinates could be provided through an Internet connection, to a website such as flightview.com, which provides real time updates of aircraft positions.

At decision step 312, it is necessary to determine whether the aircraft is in a position to cause multipath interference with the transmission of signals from transmitter 102 to receiver 106 in FIG. 1. More specifically, it must be determined whether or not the aircraft is positioned between the transmitter antenna 104 and receiver 106. At step 312, the respective coordinate positions of the aircraft, receiver 106 and transmitter antenna 104 have all become available. Processing unit 116 may use all this positional information, in accordance with a conventional technique, to readily determine whether the aircraft is or is not between the receiver and the transmitter positions, as required by decision step 312. If the result of step 312 is negative, the method returns to step 304.

If it is determined that step 312 is affirmative, so that the aircraft is in fact positioned between the positions of the receiver and the transmitter tower antenna, it is necessary to proceed to step 314. Step 314 requires determining the time delay between direct or primary signal component 110a in FIG. 1 and reflected or secondary signal component 110b. Time delay, more specifically, is the amount of time that elapses from the receipt of component 110a at receiver 106, until component 110b arrives at the receiver, wherein reflected multipath component 110b corresponds to component 110a.

As an illustrative example, if the aircraft 112 in FIG. 1 is five miles down range from the receiver, one mile in altitude and thirty degrees in bearing between both the transmitter antenna 104 and receiver 106, the computed multipath signal delay time would be two microseconds. This example indicates the respective parameters that could be used by processing unit 116 to compute time delay, using a currently available technique. The range of the aircraft from the receiver, its altitude, and the angular bearing of the aircraft with respect to the receiver and also with respect to the transmitter antenna can all be determined from the respective positions of the aircraft, receiver and transmitter antenna. Each of these positions is already available, as described above.

More generally, the positions of the aircraft, receiver and transmitter can be used to determine the lengths of the paths traveled by signal components 110a and 110b in FIG. 1, respectively. Time delay can then be computed by dividing each path length by signal transmission speed.

After computing signal delay time TD, the method of FIG. 3 consecutively performs steps 316 and 318. Step 316 reads the primary signal component 110a which is received at receiver 106. Then, at step 318, processing circuitry included with unit 116 shifts the waveform of the primary signal by the computed delay time, described above. The processing circuitry then applies an amplitude reduction transform, in order to cancel out the secondary signal received from the aircraft.

To further illustrate steps 316 and 318, FIG. 2 is again referred to. Primary signal waveform 202 includes a portion or segment $S_1$-$S_2$, between the points $S_1$ and $S_2$. Secondary signal waveform 204 includes a portion $S'_1$-$S'_2$ between the points $S'_1$ and $S'_2$, which corresponds to the segment $S_1$-$S_2$ of waveform 204 as shifted by the time delay. Accordingly, at step 316 the primary signal portion $S_1$-$S_2$ received at receiver 106 is retrieved, or read out to processing unit 116 in FIG. 1. This retrieved primary portion is then used at step 318, together with the time delay and the amplitude reduction transform, to remove effects of the reflected secondary signal from the primary signal. In one comparatively simple approach, the retrieved primary segment $S_1$-$S_2$ could be shifted by the time delay, and inverted by a 180 degree phase shift. The shifted and inverted segment would then be combined with secondary segment $S'_1$-$S'_2$, to effectively cancel such secondary segment.

Figure 4:
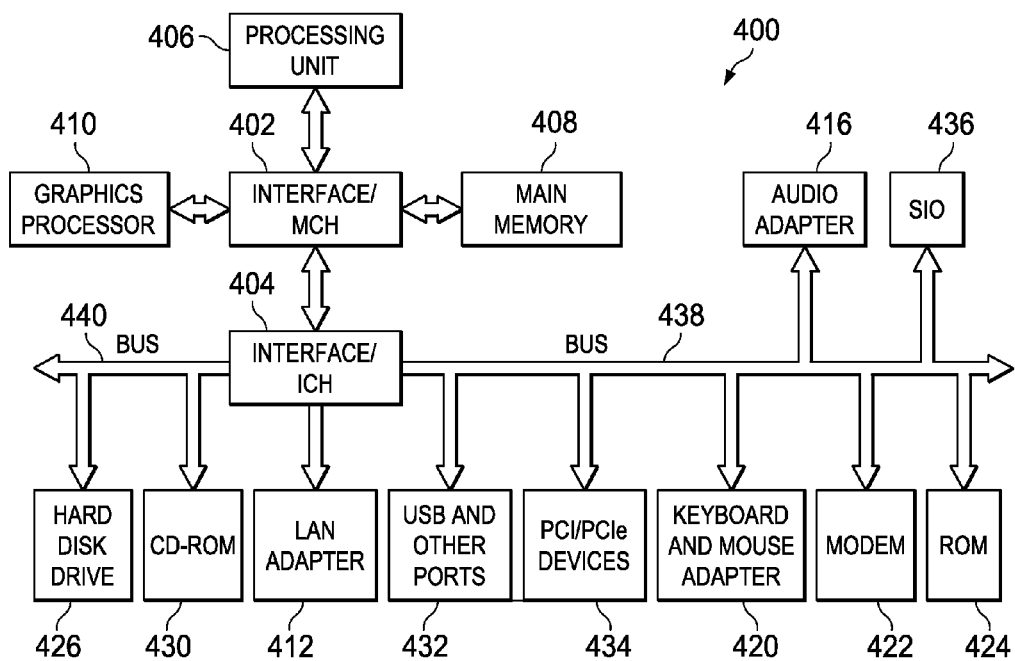
FIG. 4 is a block diagram showing a computer or data processing system for use in implementing an embodiment of the invention.

Referring to FIG. 4, there is shown a block diagram of a data processing system 400 in which aspects of the present invention may be implemented. For example, data processing system 400 may be used to implement processing unit 116 in FIG. 1. Data processing system 400 is an example of a computer in which computer usable code or instructions implementing the processes for embodiments of the present invention may be located.

In the depicted example, data processing system 400 employs a hub architecture including interface and memory controller hub (Interface/MCH) 402 and interface and input/output (I/O) controller hub (Interface/ICH) 404. Processing unit 406, main memory 408, and graphics processor 410 are connected to Interface/MCH 402. Graphics processor 410 may be connected to Interface/MCH 402 through an accelerated graphics port (AGP).

In the depicted example, local area network (LAN) adapter 412 connects to Interface/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to Interface/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash binary input/output system (BIOS).

HDD 426 and CD-ROM drive 430 connect to Interface/ICH 404 through bus 440. HDD 426 and CD-ROM drive 430 may use, for example, an integrated drive electronics (IDE) or serial advanced technology attachment (SATA) interface. Super I/O (SIO) device 436 may be connected to Interface/ICH 404.

An operating system runs on processing unit 406 and coordinates and provides control of various components within data processing system 400 in FIG. 4. As a client, the operating system may be a commercially available operating system, such as Microsoft® Windows® XP (Microsoft and Windows are trademarks of Microsoft Corporation in the United States, other countries, or both). An object-oriented programming system, such as the Java™ programming system, may run in conjunction with the operating system and provide calls to the operating system from Java™ programs or applications executing on data processing system 400 (Java is a trademark of Sun Microsystems, Inc. in the United States, other countries, or both).

As a server, data processing system 400 may be, for example, an IBM® eServer™ System p computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for embodiments of the present invention are performed by processing unit 406 using computer usable program code, which may be located in a memory, such as, for example, main memory 408, ROM 424, or in one or more peripheral devices, such as HDD 426 and CD-ROM 430.

Those of ordinary skill in the art will appreciate that the hardware in FIG. 4 may vary depending on the implementation. Other internal hardware or peripheral devices, such as flash memory, equivalent non-volatile memory, or optical disk drives and the like, may be used in addition to or in place of the hardware depicted in FIG. 4. Also, the processes of the present invention may be applied to a multiprocessor data processing system. In some illustrative examples, data processing system 400 may be a personal digital assistant (PDA), which is configured with flash memory to provide non-volatile memory for storing operating system files and/or user-generated data.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a wireless system wherein a transmitter is disposed to transmit a signal to a receiver along a direct signal transmission path extending between the transmitter and the receiver, a method comprising the steps of:

selectively determining the respective positions of the transmitter and the receiver;

receiving notice at a selected location that a moving vehicle is proximate to the direct signal transmission path;

responsive to receiving said notice, determining the position of the moving vehicle;

using the determined positions of the transmitter, the receiver and the moving vehicle to determine whether the moving vehicle is located between the transmitter position and the receiver position;

responsive to determining that the moving vehicle is located between the transmitter position and the receiver position, using the determined moving vehicle position to calculate the time delay between the times at which first and second components of the transmitted signal are respectively received at the receiver, wherein the first signal component is transmitted directly to the receiver from the transmitter along the signal transmission path, and the second signal component is transmitted to the receiver after reflection from the moving vehicle; and using the calculated time delay and an amplitude reduction transform to remove an effect of the second signal to provide a corrective signal component, wherein the corrective signal component is employed to reduce degradation of the first signal component that is caused by the second signal component.

2. The method of claim 1, wherein:
notice is provided that said moving vehicle is proximate to said signal transmission path when said receiver receives an automatic dependent surveillance-broadcast (ADBS) signal sent from said moving vehicle.

3. The method of claim 1, wherein:
said corrective signal component is combined with at least a portion of said second signal component to reduce degradation of said first signal component.

4. The method of claim 1, wherein:
said moving vehicle comprises an aircraft.

5. The method of claim 4, wherein:
said time delay is computed using parameters that include at least the range of said aircraft from said receiver, the altitude of said aircraft, and the bearing of said aircraft from both said receiver and said transmitter.

6. The method of claim 1, wherein:
said receiver is mounted on a specified motor vehicle for movement therewith.

7. The method of claim 6, wherein:
a GPS device is mounted on said specified motor vehicle for movement with said receiver, for providing the position of said receiver.

8. The method of claim 4, wherein:
the position of said aircraft is provided by an ADBS signal sent from said aircraft, or by a specified website, selectively.

9. The method of claim 1, wherein:
said receiver is disposed to receive analog or digital television signals, selectively, from said transmitter.

10. The method of claim 1, wherein:
respective steps of said method are carried out during one or more intervals in a succession of intervals of specified time length.

11. In association with a wireless system wherein a transmitter is disposed to transmit a signal to a receiver along a direct signal transmission path extending between the transmitter and the receiver, a computer program product executable in a non-transitory computer readable [medium] device comprising:
  instructions for selectively determining the respective positions of the transmitter and the receiver;
  instructions for receiving notice at a selected location that a moving vehicle is proximate to the direct signal transmission path;
  instructions responsive to receiving said notice, for determining the position of the moving vehicle;
  instructions for using the determined positions of the transmitter, the receiver and the moving vehicle to determine whether the moving vehicle is located between the transmitter position and the receiver position;
  instructions responsive to determining that the moving vehicle is located between the transmitter position and the receiver position, for using the determined moving vehicle position to calculate the time delay between the times at which first and second components of the transmitted signal are respectively received at the receiver, wherein the first signal component is transmitted directly to the receiver from the transmitter along the signal transmission path, and the second signal component is transmitted to the receiver after reflection from the moving vehicle; and
  instructions for using the calculated time delay and an amplitude reduction transform to remove an effect of the second signal to provide a corrective signal component, wherein the corrective signal component is employed to reduce degradation of the first signal component that is caused by the second signal component.

12. The computer program product of claim 11, wherein:
notice is provided that said moving vehicle is proximate to said signal transmission path when said receiver receives an automatic dependent surveillance-broadcast (ADBS) signal sent from said moving vehicle.

13. The computer program product of claim 11, wherein:
said corrective signal component is combined with at least a portion of said second signal component to reduce degradation of said first signal component.

14. The computer program product of claim 11, wherein:
said moving vehicle comprises an aircraft.

15. The computer program product of claim 14, wherein:
the position of said aircraft is provided by an ADBS signal sent from said aircraft, or by a specified website, selectively.

16. In association with a wireless system wherein a transmitter is disposed to transmit a signal to a receiver along a direct signal transmission path extending between the transmitter and the receiver, apparatus comprising:
  means for selectively determining the respective positions of the transmitter and the receiver;
  means for receiving notice at a selected location that a moving vehicle is proximate to the direct signal transmission path;
  means responsive to receiving said notice, for determining the position of the moving vehicle;
  means for using the determined positions of the transmitter, the receiver and the moving vehicle to determine whether the moving vehicle is located between the transmitter position and the receiver position;
  means responsive to determining that the moving vehicle is located between the transmitter position and the receiver position, for using the determined moving vehicle position to calculate the time delay between the times at which first and second components of the transmitted signal are respectively received at the receiver, wherein the first signal component is transmitted directly to the receiver from the transmitter along the signal transmission path, and the second signal component is transmitted to the receiver after reflection from the moving vehicle; and
  means for using the calculated time delay and an amplitude reduction transform to remove an effect of the second signal to provide a corrective signal component, wherein the corrective signal component is employed to reduce degradation of the first signal component that is caused by the second signal component.

17. The apparatus of claim 16, wherein:
notice is provided that said moving vehicle is proximate to said signal transmission path when said receiver receives an automatic dependent surveillance-broadcast (ADBS) signal sent from said moving vehicle.

18. The apparatus of claim 16, wherein:
said corrective signal component is combined with at least a portion of said second signal component to reduce degradation of said first signal component.

19. The apparatus of claim 16, wherein:
said moving vehicle comprises an aircraft.

20. The apparatus of claim 19, wherein:
the position of said aircraft is provided by an ADBS signal sent from said aircraft, or by a specified website, selectively.

* * * * *